R. CRAIG.
IMPACT PROPELLING DEVICE.
APPLICATION FILED AUG. 8, 1917.

1,288,842.

Patented Dec. 24, 1918.

Inventor
Robert Craig
by Graham Harris
Attorneys.

UNITED STATES PATENT OFFICE.

ROBERT CRAIG, OF LOS ANGELES, CALIFORNIA.

IMPACT PROPELLING DEVICE.

1,288,842.     Specification of Letters Patent.     Patented Dec. 24, 1918.

Application filed August 8, 1917.   Serial No. 185,399.

*To all whom it may concern:*

Be it known that I, ROBERT CRAIG, a citizen of the United States, residing at Los Angeles, in the county of Los Angeles, State of California, have invented a new and useful Impact Propelling Device, of which the following is a specification.

My invention relates to vehicle propelling devices for use with self driven vehicles, especially agricultural tractors and the like.

The principal object of my invention is to produce a device of the class described of simple form and construction and of light weight as the action of the device does not depend upon the weight of the same for traction purposes, but depends upon the grip obtained on the ground by the impact of a series of blades which enter the ground and pull the device thereover.

Other objects and advantages will appear hereinafter from the following description.

Referring to the drawings, which are for illustrative purposes only,

Figure 1:
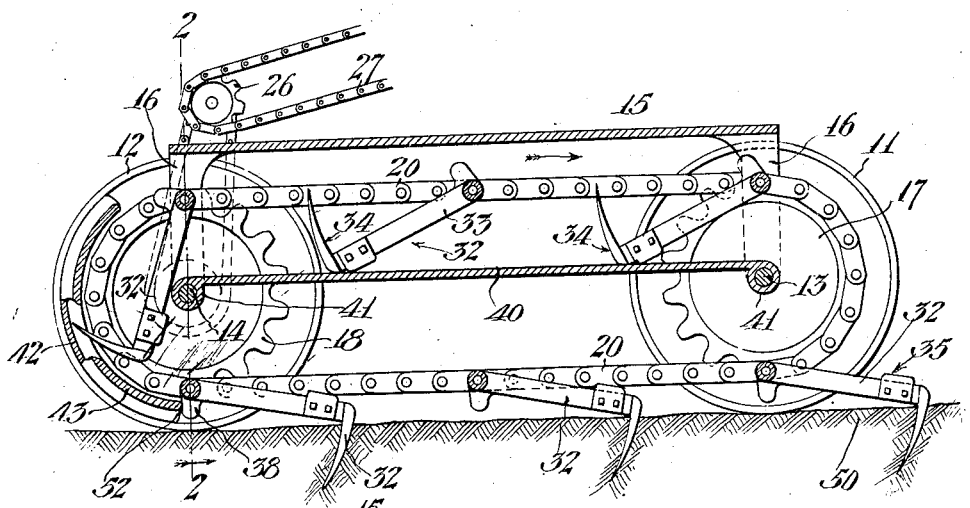
Figure 1 is a sectional elevation of a device embodying a form of my invention.
Figure 2:
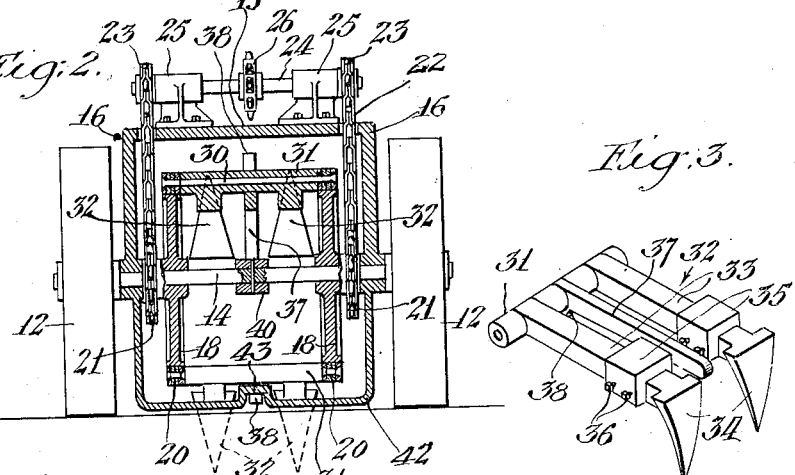
Fig. 2 is a vertical sectional view on line 2—2 of Fig. 1.
Figure 3:
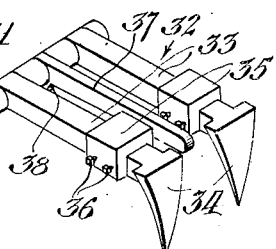
Fig. 3 is a perspective view of one of the impact elements.
Figure 4:
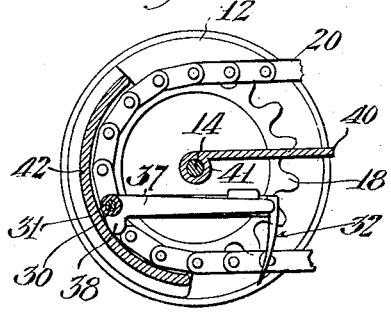
Fig. 4 is a sectional view similar to the rear end of Fig. 1, the parts being shown in a different position.

11 and 12 indicate flat wheels at the forward and rear end of the device respectively, there being two such wheels at each end. The wheels 11 are freely mounted on a shaft 13 and the wheels 12 are freely mounted upon a shaft 14.

15 designates a platform supported on the shafts 13 and 14 by brackets 16, the platform 15 being arranged to support any suitable form of power device for operating the mechanism hereinafter described. Freely mounted on the shafts 13 and 14 are sprocket wheels 17 and 18 respectively, over which travel endless chains 20, the sprocket wheels 18 being driven by means of sprockets 21 formed on the hubs of the wheels 18, which in turn are driven by chains 22 from sprockets 23 secured to a shaft 24 mounted in brackets 25 on the platform 15, such shaft 24 being provided with a sprocket 26 which is driven by means of a chain 27 from any suitable power source not shown.

Mounted on the sprocket chains 20 by means of rods 30, which are secured to the chains in any suitable manner, are a series of sleeves 31 each of which is freely rotatable on its respective rod and each of which is provided with two impact devices 32. Each impact device 32 consists of a shank 33 terminating in a V shaped blade 34, a weight 35 being provided on each shank 33, which weight may be adjusted on its associated shank by means of bolts 36.

Formed on each sleeve 31 between the impact devices thereon is an arm 37 which extends between the impact devices and which terminates on its lower side in a downwardly depending lug, partially formed on the arm and partially on the sleeves.

The outer end of each arm 37 is substantially in alinement with the upper portion of its associated blades 34 and is designed to travel during a portion of its travel on a track 40 supported on the shafts 13 and 14 by means of hubs 41 formed on the ends of the track.

Formed on the brackets 16 at the rear end of the device is a curved cam plate 42 having a central cam track 43 adapted to be engaged by the lugs 38, the portion of the plate 42 at each side of the track 43 being of greater diameter to permit the blades 34 to freely pass over the plate.

The device operates in the following manner:

The chains 20 are driven in the direction of the arrow shown in Fig. 1 by the mechanism heretofore described. The impact devices 32 on the upper runs of the chains 20 assume the position shown in Fig. 1, due to the fact that the arms 37 ride upon the track 40. As the impact devices reach the forward end of the track 40 and are caused to travel with a circular movement due to the chains 20 traveling around the sprocket wheels 17, the outer ends of blades 34 drop outwardly and downwardly and are driven into the ground by reason of the weights 35 thereon as indicated at 50 as shown in Fig. 1. As the chain travels rearwardly on its lower run, the vehicle is pulled forward due to the engagement of the blades in the ground.

As the chains 20 engage the sprocket 18, the lug 38 on the arm 37 engages the cam track 43 as indicated at 52 in Fig. 1. The continued movement of the chains causes the blades 34 of the impact device associated with the arm in engagement with the cam track to be drawn upwardly out of engagement with the earth, thereby freeing such blades and permitting the same to pass around their travel at the rear end of the device.

With the device constructed as above described, it is to be understood that the device is pulled forwardly on the ground, supported on the wheels 11 and 12 by the pulling action of the lower run of the chains 20 against the earth with which the blades 34 are in contact during their movement with the lower run of the chains, and that the traction so obtained is by virtue of the grip of the blades on the earth, by the impact of the blades with the earth, and the pulling action above described and not due to the weight of the vehicle as is the case in ordinary forms of traction devices.

What I claim is:—

1. An impact propelling device comprising a wheeled support, a driven chain on said support, a series of blades pivotally connected to said chain adapted to successively enter the ground, and means for successively drawing said blades from the ground, said means consisting of a cam, and means connected with each of said blades adapted to engage the cam.

2. A traction device comprising a wheeled support, sprocket wheels mounted on said support, endless chains on said sprocket wheels arranged to have an upper run and a lower run, a series of blades pivotally connected to said chains, weights for each blade, track means for supporting said blades below the upper run of said chains, said blades being arranged to be thrown forwardly and downwardly while said chains pass around the sprocket wheels at one end of the device so as to cause the blades to enter the ground, cam means for causing the blades to disengage the ground at the opposite end of the device, and means for driving the chains through the sprocket wheels.

3. An impact traction device comprising a shank; a rod about which said shank is free to turn; a blade secured on the outer or free end of said shank; a driving means for driving said blade into the ground; propelling mechanism for propelling the device forward by pulling on said rod; and retracting means for withdrawing said blade from the ground by rotating said shank about the rod whenever said device has been propelled forward to the limit of said propelling mechanism.

4. The combination of claim 3 in which the plane of the blade lies approximately in the circumference of a circle struck from the center of the rod.

5. The combinations of claim 3 in which the driving means comprises a weight attached to the shank at or near the blade; and release means for dropping said blade and weight in such a manner as to drive said blade into the ground.

6. The combinations of claim 3 in which the propelling means comprises chains in which said rods are secured; sprockets by which said chains are driven; a pair of axles on which said sprockets turn; a frame supported on said axles provided with bearings in which said axles turn in parallel relationship with each other; and wheels on said axles on which said impact traction device is carried.

7. The combinations of claim 3 in which the retracting means comprises a member so placed as to engage the shank and force it to rotate in such a manner as to withdraw the blade from the ground.

8. The combinations of claim 3 in which the driving means comprises a weight attached to the shank at or near the blade; and release means for dropping said blade and weight in such a manner as to drive said blade into the ground.

9. The combinations of claim 4 in which the propelling means comprises chains in which said rods are secured: sprockets by which said chains are driven; a pair of axles on which said sprockets turn; a frame supported on said axles provided with bearings in which said axles turn in parallel relationship with each other; and wheels on said axles on which said impact traction device is carried.

10. The combinations of claim 4 in which the retracting means comprises a member so placed as to engage the shank and force it to rotate in such a manner as to withdraw the blade from the ground.

11. The combinations of claim 5 in which the propelling means comprises chains in which said rods are secured; sprockets by which said chains are driven; a pair of axles on which said sprockets turn; a frame supported on said axles provided with bearings in which said axles turn in parallel relationship with each other; and wheels on said axles on which said impact traction device is carried.

12. The combinations of claim 5 in which the retracting means comprises a member so placed as to engage the shank and force it to rotate in such a manner as to withdraw the blade from the ground.

13. The combinations of claim 6 in which the retracting means comprises a member so placed as to engage the shank and force it to rotate in such a manner as to withdraw the blade from the ground.

In testimony whereof, I have hereunto set my hand at Los Angeles, California, this 31st day of July, 1917.

ROBERT CRAIG.